(12) United States Patent
Molina Hamdan et al.

(10) Patent No.: US 12,049,293 B2
(45) Date of Patent: Jul. 30, 2024

(54) LINKING MEMBER BETWEEN A FIRST AND A SECOND STRUCTURAL MEMBER OF A FUSELAGE OF AN AIRCRAFT ALLOWING IMPROVED DISSIPATION OF STRESSES

(71) Applicant: Airbus Operations (S.A.S.), Toulouse (FR)

(72) Inventors: Omar Molina Hamdan, Toulouse (FR); Valérie Lavigne, Toulouse (FR); Jérôme Dubost, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 142 days.

(21) Appl. No.: 17/849,889

(22) Filed: Jun. 27, 2022

(65) Prior Publication Data

US 2022/0411038 A1    Dec. 29, 2022

(30) Foreign Application Priority Data

Jun. 29, 2021 (FR) ...................................... 2106994

(51) Int. Cl.
*B64C 1/06* (2006.01)
*B64C 1/12* (2006.01)

(52) U.S. Cl.
CPC ................ *B64C 1/062* (2013.01); *B64C 1/12* (2013.01)

(58) Field of Classification Search
CPC .......... B64C 1/062; B64C 1/12; B22F 3/1115; B33Y 80/00; C22C 1/0458
See application file for complete search history.

(56) References Cited

U.S. PATENT DOCUMENTS

| | | | | | |
|---|---|---|---|---|---|
| 3,591,109 | A | * | 7/1971 | McLarty | B64C 1/06 244/17.23 |
| 7,382,959 | B1 | * | 6/2008 | Jacobsen | G02B 1/005 430/290 |
| 7,510,052 | B2 | * | 3/2009 | Ayle | F02C 7/24 181/290 |
| 8,066,098 | B2 | * | 11/2011 | Ayle | F02C 7/24 181/292 |
| 8,079,443 | B2 | * | 12/2011 | Keller | B64C 1/40 181/292 |
| 9,199,714 | B2 | * | 12/2015 | Depeige | B64C 1/1461 |

(Continued)

FOREIGN PATENT DOCUMENTS

EP    1 812 288 B1    8/2007

OTHER PUBLICATIONS

European Office Action for Application No. 22179653 dated Oct. 26, 2022.

(Continued)

*Primary Examiner* — Medhat Badawi
(74) *Attorney, Agent, or Firm* — KDW Firm PLLC (57) ABSTRACT

A linking member between a first and a second structural member of a fuselage of an aircraft allowing improved dissipation of stresses. The linking member has a first part made of a solid structure and at least one second part made of a lattice structure. The first part made of the solid structure is configured to dissipate static stresses and to withstand fatigue up to a predetermined maximum stress and fatigue threshold. This configuration allows improved dissipation of the stresses exerted on the linking member.

20 Claims, 5 Drawing Sheets

(56) References Cited

U.S. PATENT DOCUMENTS

| | | | | |
|---|---|---|---|---|
| 9,222,229 | B1* | 12/2015 | Chang | G10K 11/172 |
| 9,978,354 | B2* | 5/2018 | Nampy | G10K 11/168 |
| 9,988,136 | B2* | 6/2018 | Tiryaki | B22F 7/004 |
| 11,047,304 | B2* | 6/2021 | Lin | B33Y 80/00 |
| 11,260,582 | B2* | 3/2022 | TenHouten | B29C 64/153 |
| 11,434,819 | B2* | 9/2022 | Murugappan | F04D 29/664 |
| 11,591,065 | B2* | 2/2023 | Roggeveen | B64C 9/18 |
| 2008/0023583 | A1* | 1/2008 | Payen | B64C 1/065 |
| | | | | 244/119 |
| 2008/0093503 | A1* | 4/2008 | Cacciaguerra | B64C 1/18 |
| | | | | 244/119 |
| 2016/0129984 | A1* | 5/2016 | Tiryaki | B64C 1/064 |
| | | | | 244/119 |
| 2020/0239124 | A1* | 7/2020 | Yoshida | F02K 7/10 |
| 2021/0391627 | A1* | 12/2021 | Villanueva | H01M 10/625 |
| 2022/0220587 | A1* | 7/2022 | Pun | B23K 26/082 |
| 2022/0220589 | A1* | 7/2022 | Pun | C22C 21/08 |
| 2022/0411038 | A1* | 12/2022 | Molina Hamdan | B64C 1/12 |

OTHER PUBLICATIONS

French Search Report for Application No. 2106994 dated Mar. 3, 2022.

\* cited by examiner

LINKING MEMBER BETWEEN A FIRST AND A SECOND STRUCTURAL MEMBER OF A FUSELAGE OF AN AIRCRAFT ALLOWING IMPROVED DISSIPATION OF STRESSES

CROSS-REFERENCE TO RELATED APPLICATION

This application claims priority to French patent application number 2106994 filed on Jun. 29, 2021, the entire disclosure of which is incorporated by reference herein.

TECHNICAL FIELD

The disclosure herein relates to a linking member intended to connect the skin of a fuselage of an aircraft to a frame of the aircraft. This linking member helps to dissipate any stresses that occur during dynamic loading, such as any ground impacts of the aircraft.

BACKGROUND

Aircraft comprise a structure designed to protect all individuals on board the aircraft in accordance with conditions that are defined by international regulations.

In the case of dynamic loads, such as any ground impacts, provisions are made to ensure that the energy generated by these dynamic loads and transferred to the aircraft structure is dissipated in specific members that are designed for this purpose.

It is known that the aircraft structure comprises a fuselage generally containing circumferentially extending frames, and an aerodynamic skin, to which these frames are fixed, as well as longitudinally extending stiffeners, which are arranged on an inner face of the skin. The aircraft structure also comprises cross-members supporting a floor and cargo hold struts.

In general, the specific members used to dissipate energy are the frames, the cargo hold struts and the cross-members.

Typically, the frames are fixed to the skin of the fuselage by linking members, called "clips" or "fittings". However, these linking members do not help to dissipate energy due to their low intrinsic contribution.

SUMMARY

An object of the disclosure herein is to overcome this disadvantage. To this end, it relates to a linking member between a first structural member and a second structural member of a fuselage of an aircraft.

According to the disclosure herein, the linking member comprises a first part made of a solid structure and at least one second part made of a lattice structure, the first part made of the solid structure being configured to dissipate static stresses and to withstand fatigue up to a predetermined maximum stress and fatigue threshold.

Thus, the use of the part made of a lattice structure therefore allows a new source of energy dissipation to be acquired that ensures better overall performance capability and frees up the design constraints of the surrounding parts that typically help to dissipate energy.

According to one embodiment, the part made of the solid structure comprises at least one open portion, the open portion or portions being occupied by the second part or parts made of the lattice structure.

According to another embodiment, the second part or parts made of the lattice structure at least partly cover the first part made of the solid structure.

According to a particular feature, the linking member comprises a web plate intended to be fixed to the first structural member of the fuselage and a base plate intended to be fixed to the second structural member of the fuselage, the base plate and the web plate being connected by a joint line.

In addition, the web plate comprises a first zone in the form of a strip parallel to the joint line, the first zone comprising the open portion or portions spaced apart by at least one solid structure portion.

Advantageously, the solid structure portion or portions have a cross-section designed to dissipate the static stresses up to the predetermined maximum stress and fatigue threshold.

In addition, the solid structure portion or portions have a height perpendicular to the first zone, the height being designed so that the solid structure portion or portions are capable of dissipating the static stresses up to the predetermined maximum stress and fatigue threshold.

According to a particular feature, the web plate comprises a second zone in the form of a strip parallel to the first zone in the form of a strip, the second zone comprising first fixing holes intended to accommodate fixing members provided for fixing the linking member to the first structural member of the fuselage.

Advantageously, the first fixing holes are disposed in line with the solid structure portion or portions.

According to another particular feature, the base plate comprises second fixing holes intended to accommodate fixing elements provided for fixing the linking member to the second structural member of the fuselage.

Advantageously, the second fixing holes are disposed in line with the solid structure portion or portions.

According to one embodiment, the lattice structure completely covers the first zone over at least one face of the web plate.

In a non-limiting manner, the linking member is manufactured from titanium.

Furthermore, the linking member is manufactured by three-dimensional printing.

The disclosure herein also relates to an aircraft.

According to the disclosure herein, the aircraft comprises a fuselage comprising a first structural member, a second structural member and a linking member as specified above.

BRIEF DESCRIPTION OF THE DRAWINGS

The appended figures will provide a good understanding of how the disclosure herein can be produced. In these figures, identical reference signs denote similar elements.

DETAILED DESCRIPTION

Figure 7:
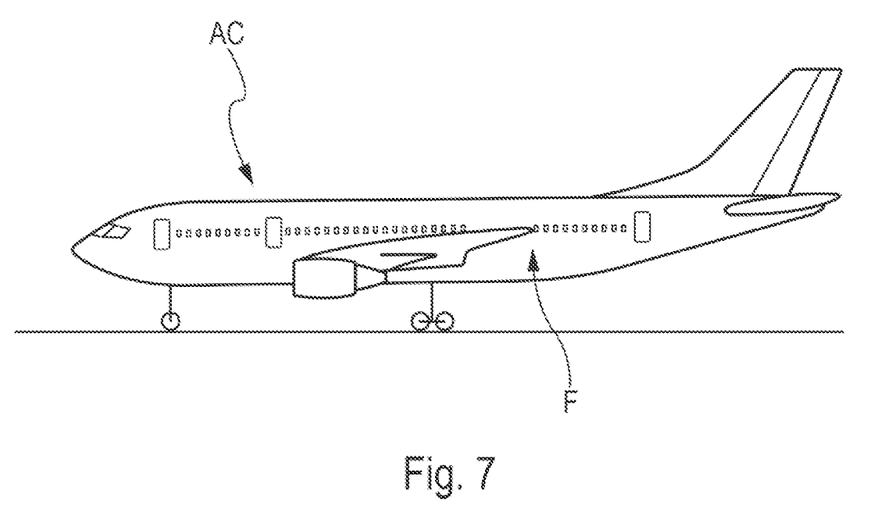
FIG. 7 shows a profile view of an aircraft having a fuselage with frames fixed to the skin by at least one linking member.

The disclosure herein relates to a linking member 1 between a structural member 13 and a structural member 14 of a fuselage F of an aircraft AC, such as a transport airplane (FIG. 7). The linking member 1 helps to fix the structural member 13 to the structural member 14 of the fuselage F of the aircraft AC.

Figure 8:
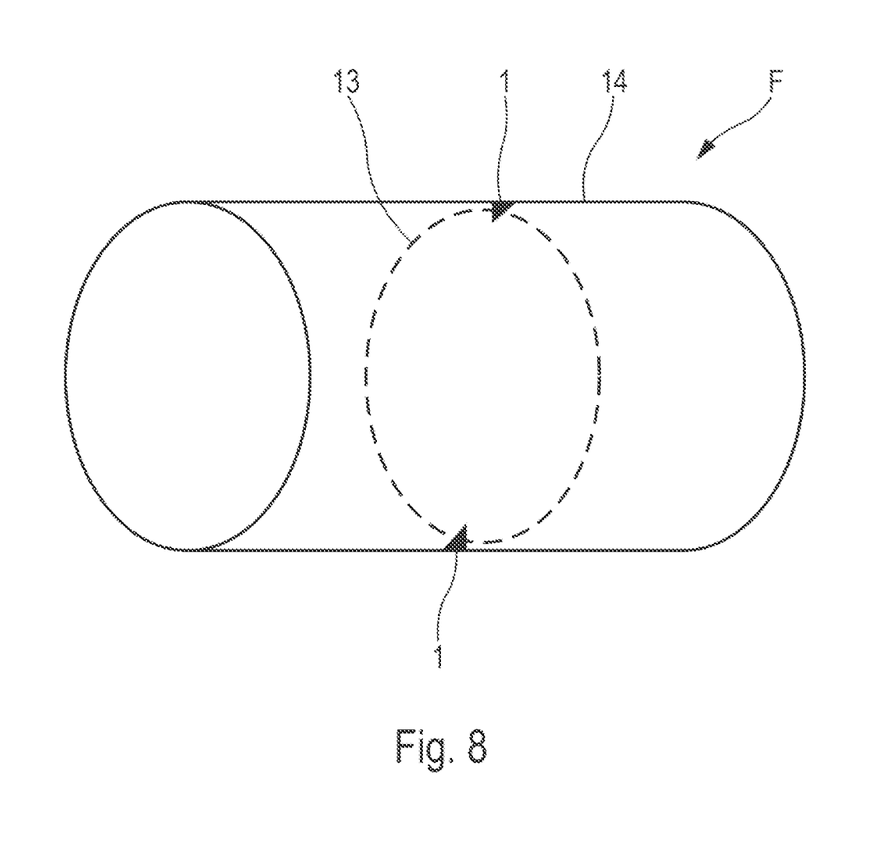
FIG. 8 shows a schematic perspective and transparent view of a portion of the fuselage of the aircraft of FIG. 7. The portion of the fuselage comprises a frame fixed to the skin by a plurality of linking members.

For example, the structural member 13 corresponds to a frame of the fuselage F and the structural member 14 corresponds to a skin of the fuselage F. FIG. 8 shows a portion of the fuselage F comprising a frame fixed to a skin by linking members 1. For the sake of clarity, only two linking members 1 are shown in FIG. 8.

Figure 1:
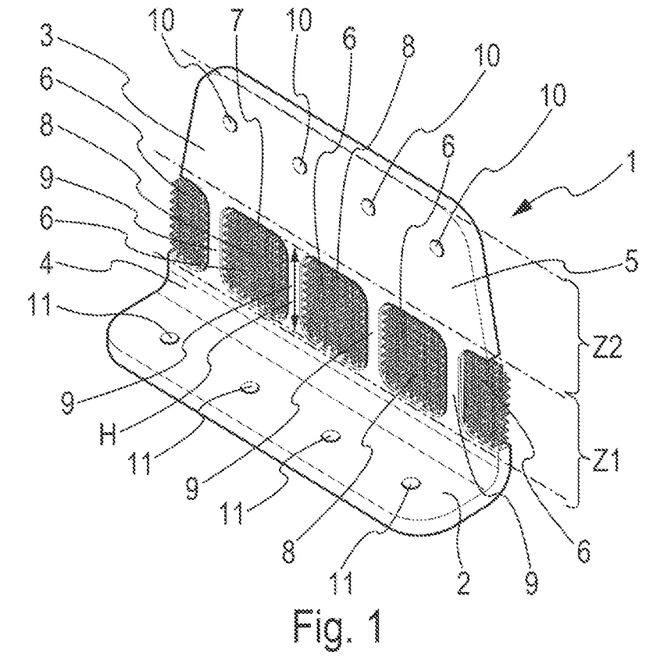
FIG. 1 is a perspective view of the linking member according to one embodiment.
Figure 2:
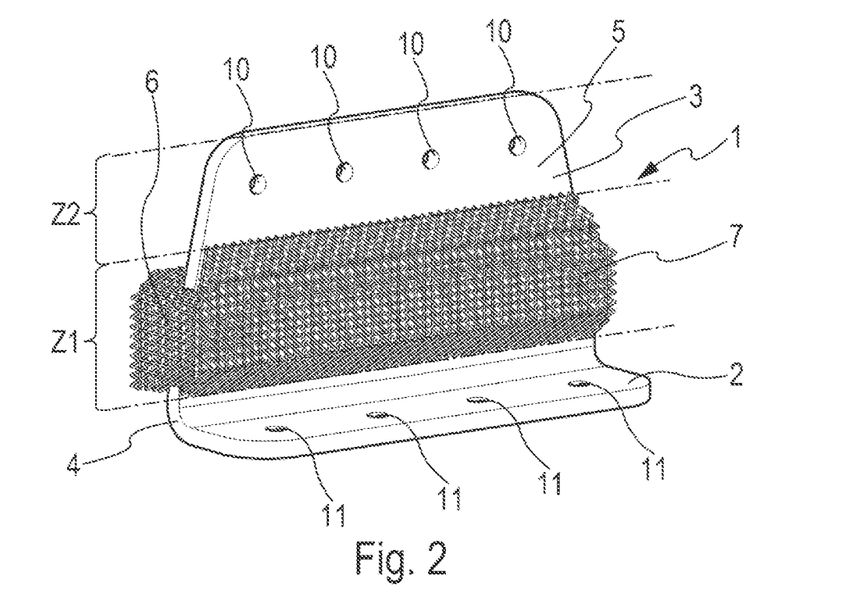
FIG. 2 is a perspective view of the linking member according to another embodiment.
Figure 4:
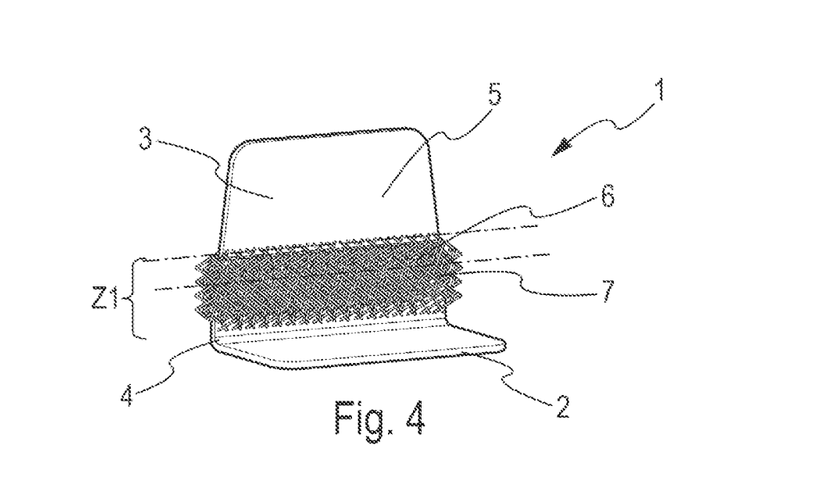
FIG. 4 shows a perspective view of the linking member according to another embodiment.
Figure 5:
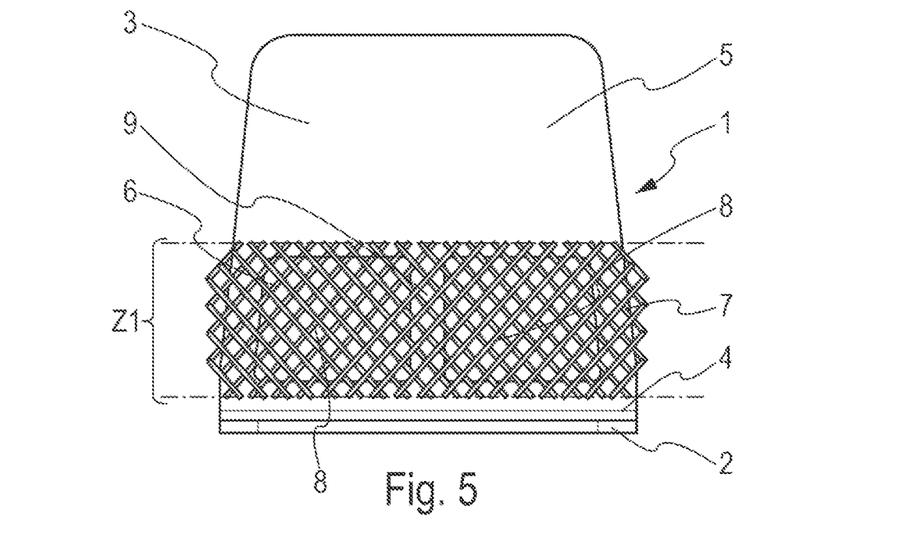
FIG. 5 shows a front view of the linking member according to the embodiment of FIG. 4.
Figure 6:
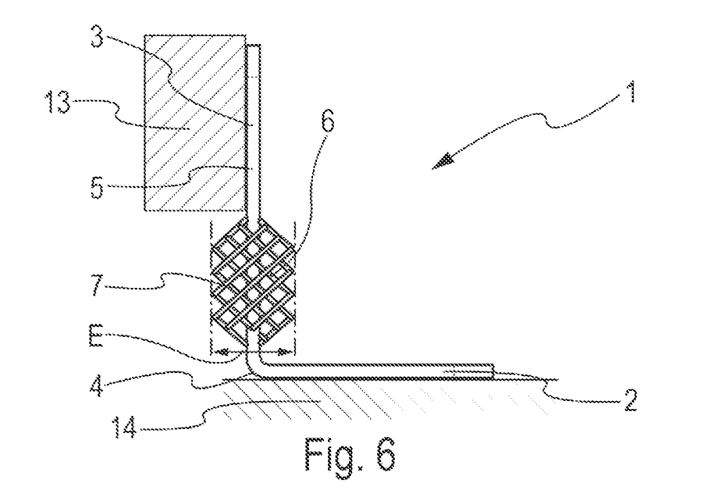
FIG. 6 shows a profile view of the linking member according to the embodiment of FIG. 4.

In FIG. 1, FIG. 2 and from FIG. 4 through FIG. 6, various linking members 1 are shown in various perspectives.

The linking member 1 comprises a part 5 made of a solid structure and at least one part 6 made of a lattice structure 7.

The part 5 made of the solid structure is configured to dissipate static stresses and to withstand fatigue up to a predetermined maximum stress and fatigue threshold.

The predetermined maximum stress and fatigue threshold can be defined as being a fatigue value below which the first part 5 made of the solid structure is capable of dissipating any static stresses that are normally exerted on the linking member 1 and of withstanding any fatigue that is normally experienced by the linking member 1.

The solid structure corresponds to a solid material.

The lattice structure 7 corresponds to a type of non-solid, porous architectural material comprising a non-stochastic spatial repetition of an elementary pattern 12. The spatial repetition of the elementary pattern 12 is valid in all three dimensions of space. The lattice structure 7 is very efficient in terms of energy dissipation per unit mass.

Figure 3:
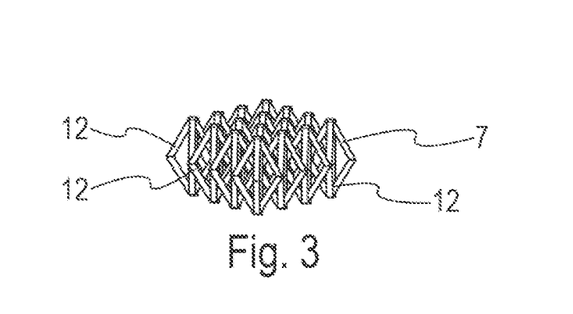
FIG. 3 shows details of an example of a lattice structure.

FIG. 3 shows a detailed example of a lattice structure 7. In this FIG. 3, the elementary pattern 12 of the lattice structure 7 corresponds to an octahedron. The lattice structure 7 of FIG. 3 is thus made of elementary patterns 12 in the shape of an octahedron spatially repeating in the three dimensions of space. Preferably, the number and the shape of the geometry of the elementary patterns 12 of a lattice structure 7 are defined so as to ensure maximum energy dissipation over the entire duration of the dynamic load.

Thus, preferably, integrating a lattice structure 7 in a linking member 1 involves compliance with the following features:
- resistance to the static stresses and fatigue typically exerted by aeronautical structures;
- triggering the dissipation of the stresses on the basis of the maximum stress and fatigue threshold;
- optimization of the dissipation that ensures the reduction of the transfer of energy to the members surrounding the linking member 1.

The use of a part 6 made of the lattice structure 7 allows a lightweight linking member 1 to be acquired compared to linking members manufactured in accordance with conventional solutions.

Preferably, the linking member 1 is one-piece, i.e., made of a single part. The part 5 made of the solid structure and the part 6 made of the lattice structure 7 thus form a one-piece assembly. The part 5 made of the solid structure and the part 6 made of the lattice structure 7 are manufactured from the same material. For example, the linking member 1 is manufactured from titanium.

Advantageously, the linking member 1 is manufactured by three-dimensional printing.

Three-dimensional printing can generate surface finish defects that can limit the fatigue resistance of the linking member 1. It therefore can be important for a configuration to be provided for the linking member 1 that allows either the zones of the linking member 1 that are subject to fatigue to be machined or a surface treatment to be used that allows a standard surface roughness to be achieved.

As shown in FIG. 1 and FIG. 5, the part 5 made of the solid structure advantageously comprises at least one open portion 8. The open portion or portions 8 are occupied by the part or parts 6 made of the lattice structure 7. The second part or parts 6 made of the lattice structure 7 can also cover, at least partly, the first part 5 made of the solid structure.

According to one embodiment, the linking member 1 comprises a base plate 2 intended to be fixed to the structural member 14 of the fuselage F and a web plate 3 intended to be fixed to the structural member 13. In an example shown in FIG. 6, the structural member 13 corresponds to a frame and the structural member 14 corresponds to a skin. In this FIG. 6, the frame and the skin are shown highly schematically. The base plate 2 and the web plate 3 are connected together by a joint line 4.

In general, the base plate 2 is substantially perpendicular to the web plate 3. The joint line 4 can correspond to a corner between the base plate 2 and the web plate 3.

The linking member 1 can have a T or L shape.

Preferably, the open portion or portions 8 are arranged through the web plate 3 of the linking member 1.

According to one configuration, the part or parts 6 made of the lattice structure 7 have a thickness E (perpendicular to the web plate 3) that is substantially equal to the thickness of the part 5 made of the solid structure of the linking member 1. According to other embodiments, this thickness E can be greater than the thickness of the part 5 made of the solid structure of the linking member 1.

As shown in FIG. 1, FIG. 2, FIG. 4 and FIG. 5, the web plate 3 can comprise a zone Z1 in the form of a strip parallel to the joint line 4. The zone Z1 thus can comprise the open portion or portions 8 spaced apart by at least one solid structure portion 9 (or also called "monolithic zone") of the part 5 made of the solid structure.

The open portion or portions 8 can be evenly spaced apart by the solid structure portion or portions 9.

The solid structure portion or portions 9 are configured so that their fatigue performance capability is optimized. Thus, it is possible to machine or post-process this solid structure portion or these solid structure portions 9 in order to improve their fatigue resistance. It is also possible to reduce any geometric errors that could be formed when manufacturing the linking member 1, in particular at the ends of the solid structure portion or portions 9.

The solid structure portion or portions 9 can have a cross-section that is designed to dissipate the static stresses up to the predetermined maximum stress and fatigue threshold. Above the predetermined maximum stress and fatigue threshold, breakage or buckling are desired so as to engage the part 6 made of the lattice structure 7. The cross-section depends on the material from which the linking member 1 is manufactured and the predetermined maximum stress and fatigue threshold.

Furthermore, the solid structure portion or portions 9 have a height H perpendicular to the joint line 4 (see FIG. 1). This height H is advantageously designed so that the solid structure portion or portions 9 are capable of dissipating the static stresses up to the predetermined maximum stress and fatigue threshold.

Advantageously, the number of physical links between the solid structure portions 9 and the part 6 made of the lattice structure 7 is limited to a number of physical links allowing separation between, on the one hand, the dissipation of the static and fatigue resistance stresses by the solid structure portion 9 and, on the other hand, the dissipation by the part 6 made of the lattice structure 7.

Preferably, the web plate 3 comprises a zone Z2 in the form of a strip parallel to the zone Z1 in the form of a strip. The zone Z2 comprises fixing holes 10 intended to accommodate fixing members provided for fixing the linking member 1 to the structural member 13 of the fuselage F. Preferably, if allowed by the assembly constraints of the fuselage F, the fixing holes 10 are disposed in line with the solid structure portion or portions 9. Advantageously, a fixing hole 10 is disposed in line with each of the solid structure portions 9. The height H of the solid structure portion or portions 9 also can be limited by constraints associated with fixing the linking member 1 to the structural member 13 of the fuselage F and to the joint line 4.

The base plate 2 can also comprise fixing holes 11 intended to accommodate fixing members provided for fixing the linking member 1 to the structural member 14. Preferably, if allowed by the assembly constraints, the fixing holes 11 are disposed in line with the solid structure portion or portions 9. Advantageously, a fixing hole 11 is disposed in line with each of the solid structure portions 9.

This arrangement of the fixing holes 10 and/or 11 allows the transfer of a pressurization force to be optimized. It optionally allows a space to be left available for the passage of tools for fixing the linking member 1.

As shown in FIG. 2, FIG. 4, FIG. 5 and FIG. 6, the lattice structure 7 can completely cover the zone Z1 on at least one face of the web plate 3.

The coverage by the lattice structure 7 allows the dissipative performance capability of the linking member 1 to be improved by providing better stability for the linking member 1 and better transfer of stresses when the stress and fatigue threshold is exceeded.

According to an embodiment shown in FIG. 2, FIG. 4 and more specifically in FIG. 6, the thickness E of the part 6 made of the lattice structure 7 can be greater than the thickness of the part 5 made of the solid structure, such that it is at least partly integrated between the structural member 13, in particular the frame of the fuselage F, and the structural member 14, in particular the skin of the fuselage F. This increase in thickness E compared to the embodiment of FIG. 1 provides the linking member 1 with better stability, enabling increased dissipation efficiency in the event of significant deformations. The thickness E can be limited by the assembly constraints for fixing the linking member 1 to the frame 13 and to the skin 14. This limitation allows a space to be left available for the passage of tools for fixing the linking member 1.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A linking member for connecting a first member of a fuselage of an aircraft to a second member of the fuselage of the aircraft, the linking member comprising:
   a web plate with at least one opening formed therein, wherein:
      the web plate is configured for fixing to the first member;
      the at least one opening is formed through an entire thickness of the web plate; and
      the web plate is configured for attachment to the first member of the fuselage;
   a base plate that is rigidly attached to the web plate, wherein the base plate is configured for attachment to the second member of the fuselage; and
   for each of the at least one opening, a lattice structure that occupies the at least one opening;
   wherein the linking member is configured to dissipate static stresses and to withstand fatigue.

2. The linking member of claim 1, wherein the linking member has a unitary construction.

3. The linking member of claim 1, wherein the lattice structure extends out of the at least one opening to at least partly cover the web plate.

4. The linking member of claim 1, wherein the base plate and the web plate are connected to each other by a joint line.

5. The linking member of claim 1, wherein the web plate and the base plate form a shape of an L or T.

6. The linking member of claim 1, wherein;
   the at least one opening is a plurality of openings, each opening of the plurality of openings having the lattice structure formed therein; and
   the web plate comprises rib portions, each of which is between laterally adjacent openings of the plurality of openings, such that each pair of laterally adjacent openings is separated by one of the rib portions.

7. The linking member of claim 1, wherein the lattice structure extends, in a direction of the thickness of the web plate in which the at least one opening is formed, out of a plane defined by the web plate, such that a thickness of the lattice structure is greater than the thickness of the web plate.

8. The linking member of claim 7, wherein the lattice structure extends, in the direction of the thickness of the web plate, both in front of and behind the web plate.

9. The linking member of claim 1, wherein the web plate comprises, on an opposite side of the at least one opening from the base plate, fixing first holes that are configured to accommodate fixing members therein for fixing the linking member to the first member by the web plate.

10. The linking member of claim 9, wherein the base plate comprises second fixing holes configured to accommodate further fixing members therein for fixing the linking member to the second structural member by the base plate.

11. The linking member of claim 10, wherein:
   the at least one opening is a plurality of openings, each opening of the plurality of openings having the lattice structure formed therein;
   the web plate comprises rib portions, each of which is between laterally adjacent openings of the plurality of openings, such that each pair of laterally adjacent openings is separated by one of the rib portions; and each of the first and second fixing holes is coplanar with a corresponding one of the rib portions.

12. The linking member of claim 6, wherein:

the plurality of openings and the rib portions define a first zone; and the lattice structure completely covers the first zone over at least one face of the web plate.

13. The linking member of claim 1, wherein the web plate, the base plate, and the lattice structure are manufactured from titanium.

14. The linking member of claim 1, wherein the linking member is manufactured by additive manufacturing.

15. An aircraft comprising a fuselage, the fuselage comprising a first member, a second member, and the linking member of claim 1 that attaches the first member to the second member.

16. The aircraft of claim 15, wherein the first member is a frame of the fuselage and the second member is a skin of the aircraft.

17. The linking member of claim 1, wherein the lattice structure is formed as a non-stochastic spatial repetition of an elementary pattern.

18. The linking member of claim 17, wherein the elementary pattern repeats in all three dimensions of space.

19. The linking member of claim 18, wherein the elementary pattern is an octahedron.

20. The linking member of claim 12, wherein the lattice structure extends continuously over, into, and between each of the plurality of openings.

\* \* \* \* \*